United States Patent
Gardopee et al.

(10) Patent No.: US 6,242,926 B1
(45) Date of Patent: Jun. 5, 2001

(54) METHOD AND APPARATUS FOR MOVING AN ARTICLE RELATIVE TO AND BETWEEN A PAIR OF THICKNESS MEASURING PROBES TO DEVELOP A THICKNESS MAP FOR THE ARTICLE

(75) Inventors: George J. Gardopee, Southbury; Anthony M. Ledger, New Fairfield; Alexander A. Gomez, Danbury, all of CT (US)

(73) Assignee: IPEC Precision, Inc., Bethel, CT (US)

( * ) Notice: Subject to any disclaimer, the term of this patent is extended or adjusted under 35 U.S.C. 154(b) by 0 days.

(21) Appl. No.: 09/228,307

(22) Filed: Jan. 12, 1999

(51) Int. Cl.$^7$ .................................................. G01R 27/26
(52) U.S. Cl. ............................................ 324/661; 324/662
(58) Field of Search .................................... 324/661, 662; 356/381, 382, 384, 385

(56) References Cited

U.S. PATENT DOCUMENTS

| | | | |
|---|---|---|---|
| 4,692,700 | * 9/1987 | Nix | 324/229 |
| 4,715,007 | * 12/1987 | Fujita et al. | 702/172 |
| 4,750,141 | 6/1988 | Judell et al. . | |
| 4,860,229 | 8/1989 | Abbe et al. . | |
| 4,910,453 | 3/1990 | Abbe et al. . | |
| 4,920,319 | * 4/1990 | Viertl | 324/451 |
| 4,931,962 | 6/1990 | Palleiko . | |
| 4,958,129 | * 9/1990 | Poduje et al. | 324/661 |
| 5,642,298 | 6/1997 | Mallory et al. . | |

OTHER PUBLICATIONS

*Acuflat Wafer Thickness Mapper User Manual* by IPEC Precision, Inc., dated Oct. 21, 1997.

* cited by examiner

Primary Examiner—Safet Metjahic
Assistant Examiner—Vincent Q. Nguyen
(74) Attorney, Agent, or Firm—Snell & Wilmer L.L.P.

(57) ABSTRACT

A method and apparatus for moving an article relative to and between a pair of distance sensing probes of a thickness measuring apparatus which are spaced apart a known distance D is described. In the method, the article is moved relative to and between the pair of probes in at least one direction in a plane normal to a common measurement axis $A_c$ between the probes. A distance a along the common measurement axis $A_c$ between the first probe and a point on the surface of the article nearest to the first probe of the pair that intersects the common measurement axis $A_c$ is measured. A similar distance b between the second probe and the article is measured. From the measured distance a, the article is moved relative to the probes along the common measurement axis $A_c$ so as to minimize any difference between the measured distance a and a desired distance $a_d$ along the common measurement axis $A_c$ between the first probe and a point on the surface of the article nearest to the first probe that intersects the common measurement axis. The measured distances a and b and the position of the article relative to the probes in at least one direction are recorded at predetermined time intervals to develop a thickness map of the article. In a thickness computation, all of the measured distances a for each recorded position of the article are substantially the same.

8 Claims, 6 Drawing Sheets

METHOD AND APPARATUS FOR MOVING AN ARTICLE RELATIVE TO AND BETWEEN A PAIR OF THICKNESS MEASURING PROBES TO DEVELOP A THICKNESS MAP FOR THE ARTICLE

BACKGROUND OF THE INVENTION

1. Field of the Invention

The present invention generally relates to the measuring of various parameters of thin materials. More particularly, the present invention relates to a method and apparatus for moving an article relative to and between a pair of non-contact thickness measuring probes for the purpose of collecting data about the article which is moved in relation to the probes so that the thickness, bow and warp parameters of the article may be determined.

2. Description of the Prior Art

ASTM F1530 describes a standard test method for measuring flatness, thickness and thickness variations of semiconductor wafers by noncontact scanning. According to the ASTM test standard, the knowledge of flatness, thickness and thickness variations of semiconductor wafers is useful to both producer and consumer of such wafers to determine if the dimensional characteristics of a given wafer satisfy certain specified geometrical requirements.

Under the standard's test method, the above characteristics are measured by placing the wafer between two probes and measuring the distance between the surfaces of the wafer and the respective adjacent probes. More specifically, the wafer, supported by a chuck, is scanned along a prescribed pattern between both members of an opposed pair of probes to generate an array of displacement values. From knowledge of the array of displacement values, thickness, flatness and thickness variations can be determined. The method described in ASTM F1530 presumes that the wafer is held by a chuck having a face that is perpendicular to a measurement axis that is drawn between the two probes and that is ideally flat and clean.

U.S. Pat. No. 4,750,141 discloses a dual probe wafer thickness measurement gauge using capacitive sensors. The gauge uses a chuck to hold the wafer. The wafer is rotated and translated between the dual probes to develop an array of data. The gauge has a means for aligning the wafer so that the data points can be repeated whenever the wafer is turned over, as required to scan the entire wafer surface. Due to the method for holding and scanning the wafer, the wafer must be chucked in at least two non-overlapping portions of the wafer. The wafer measurements is repeated and the two maps stitched together. The repositioning of the wafer and the stitching of the maps increases the time required to characterize a wafer.

All dual probe measurement gauges experience distance dynamic range non-linearities that cause thickness errors as either or all wafer warp, wafer tilt in mount and mount distortions move the wafer nearer or farther from the probes during the scanning of the wafer between the probes. To overcome the non-linearity related errors, extensive calibration of the gauge prior to measurement is required and as well as the application of that calibration to each wafer computationally during a measurement of the wafer. The calibration and application thereof increases the time required to characterize a wafer.

SUMMARY OF THE INVENTION

It is an object of the present invention to provide a method and apparatus for measuring the thickness of semiconductor wafers.

It is another object of the present invention to provide a method and apparatus to move an article relative to and between a pair of distance measuring probes so as to reduce non-linearity related errors without the use of extensive calibrations.

It is another object of the present invention to provide a method and apparatus for measuring the thickness of semiconductor wafers with reduced non-linearity related errors without the use of extensive calibrations.

The aforementioned objects are accomplished, at least in part, by a method for moving an article relative to and between a pair of distance sensing probes of a thickness measuring apparatus which are spaced apart a known distance D, wherein a line between the probes defines a common measurement axis $A_c$ and wherein the apparatus has means to move the article relative to and between the pair of probes in a plane normal to the common measurement axis $A_c$ and to move the article relative to the probes along the common measurement axis $A_c$. The method comprises the steps of: providing an article having a surface; moving the article relative to and between the pair of probes in at least one direction in the plane normal to the common measurement axis $A_c$; measuring a distance a along the common measurement axis $A_c$ between the first probe of the pair and a point on the surface of the article nearest to the first probe that intersects the common measurement axis $A_c$ and measuring a distance b along the common measurement axis $A_c$ between the second probe and a point on the surface of the article nearest to the second probe that intersects the common measurement axis $A_c$; and from the measured distance a, moving the article relative to the probes along the common measurement axis $A_c$ so as to minimize any difference between the measured distance a and a desired distance $a_d$ between the first probe and a point on the surface of the article nearest to the first probe that intersects the common measurement axis $A_c$. The measured distance a, the measured distance b and the position of the article relative to the probes are recorded at predetermined time intervals to develop at least a thickness map of the article. An apparatus for carrying out the method is disclosed.

Other objects and advantages of the present invention will become apparent and the invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

The Apparatus

Figure 1:
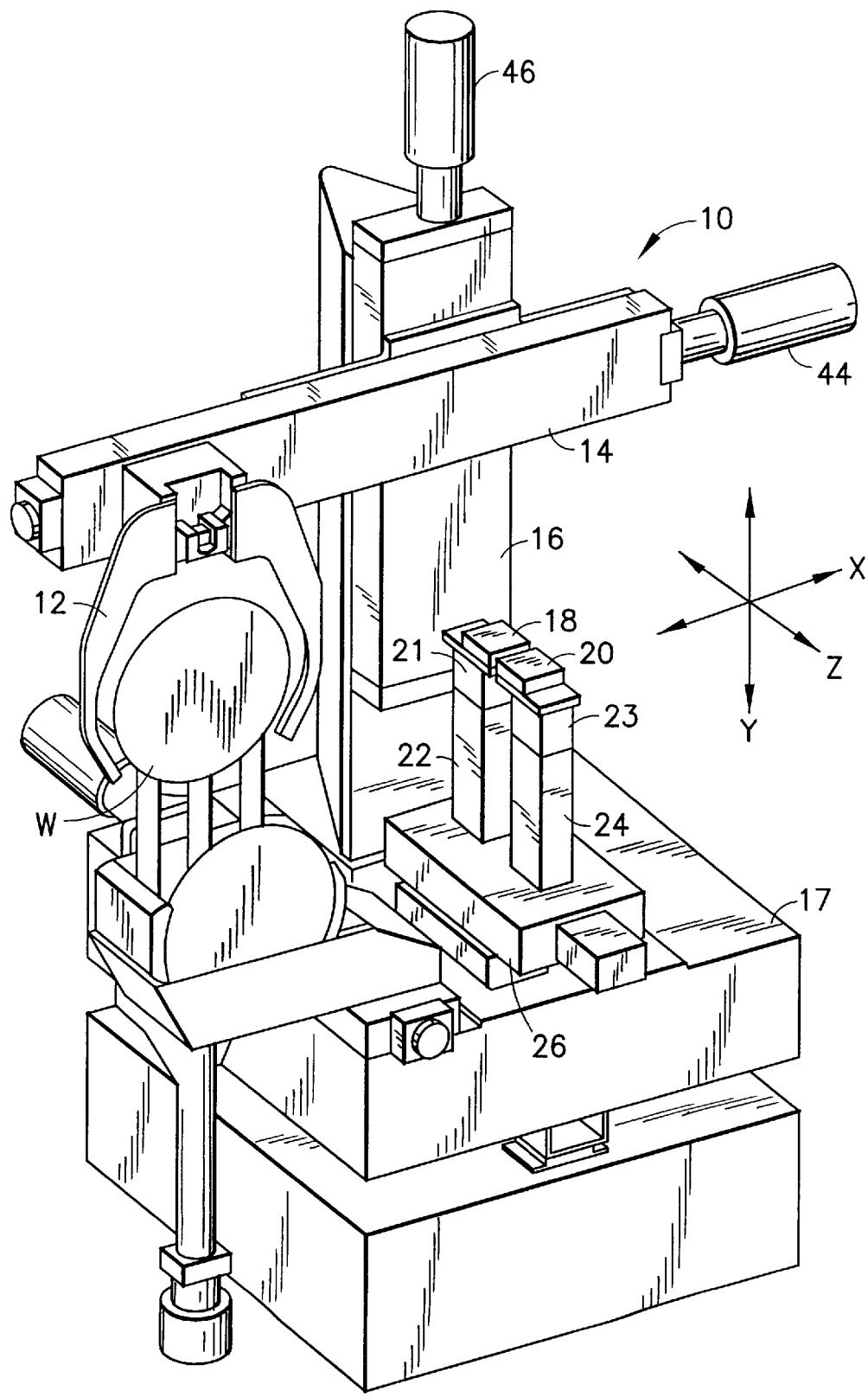
FIG. 1 is an isometric view of a dual probe wafer thickness scanning apparatus.
Figure 2:
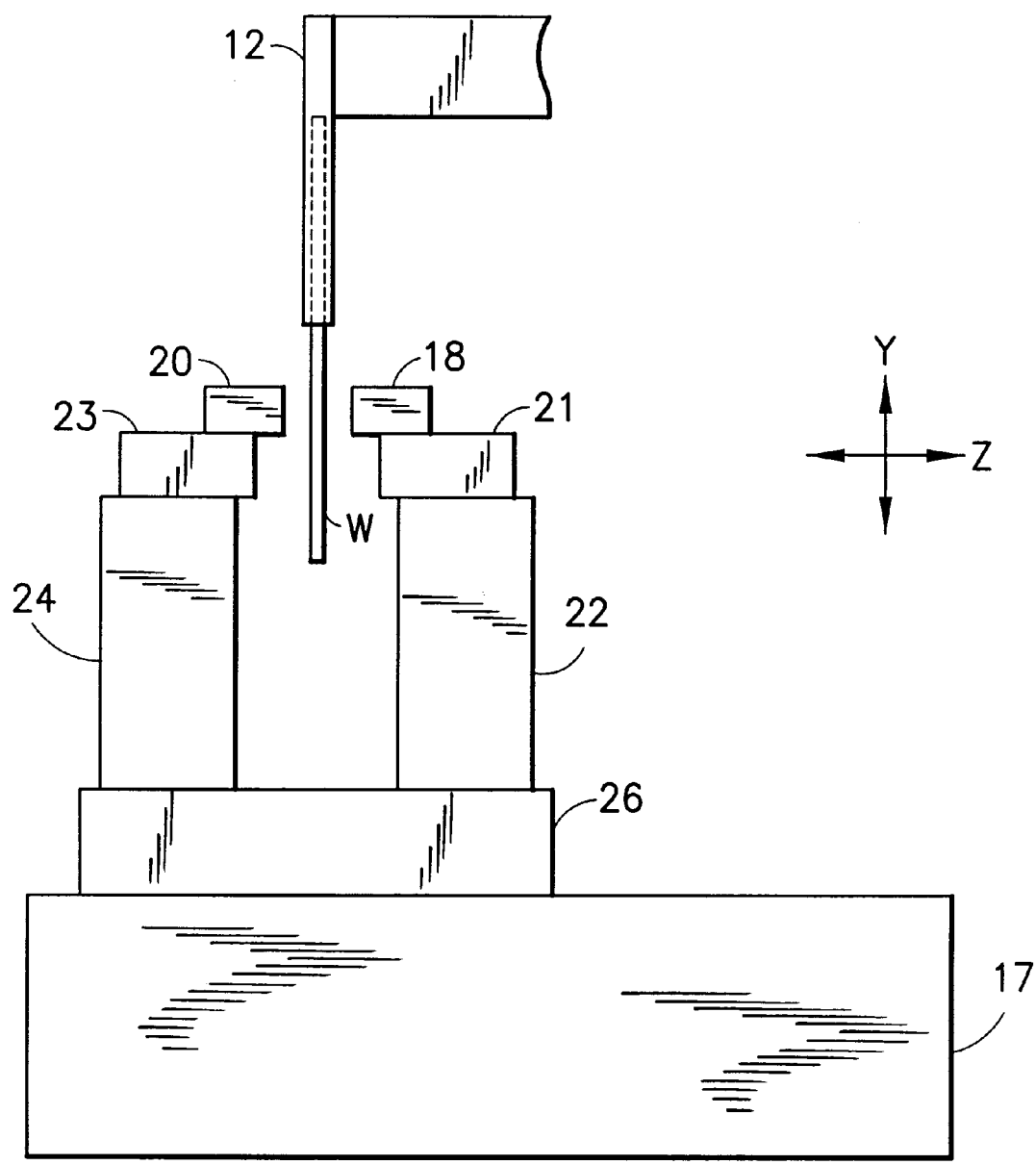
FIG. 2 is a schematic front view of the apparatus shown in FIG. 1.
Figure 3:
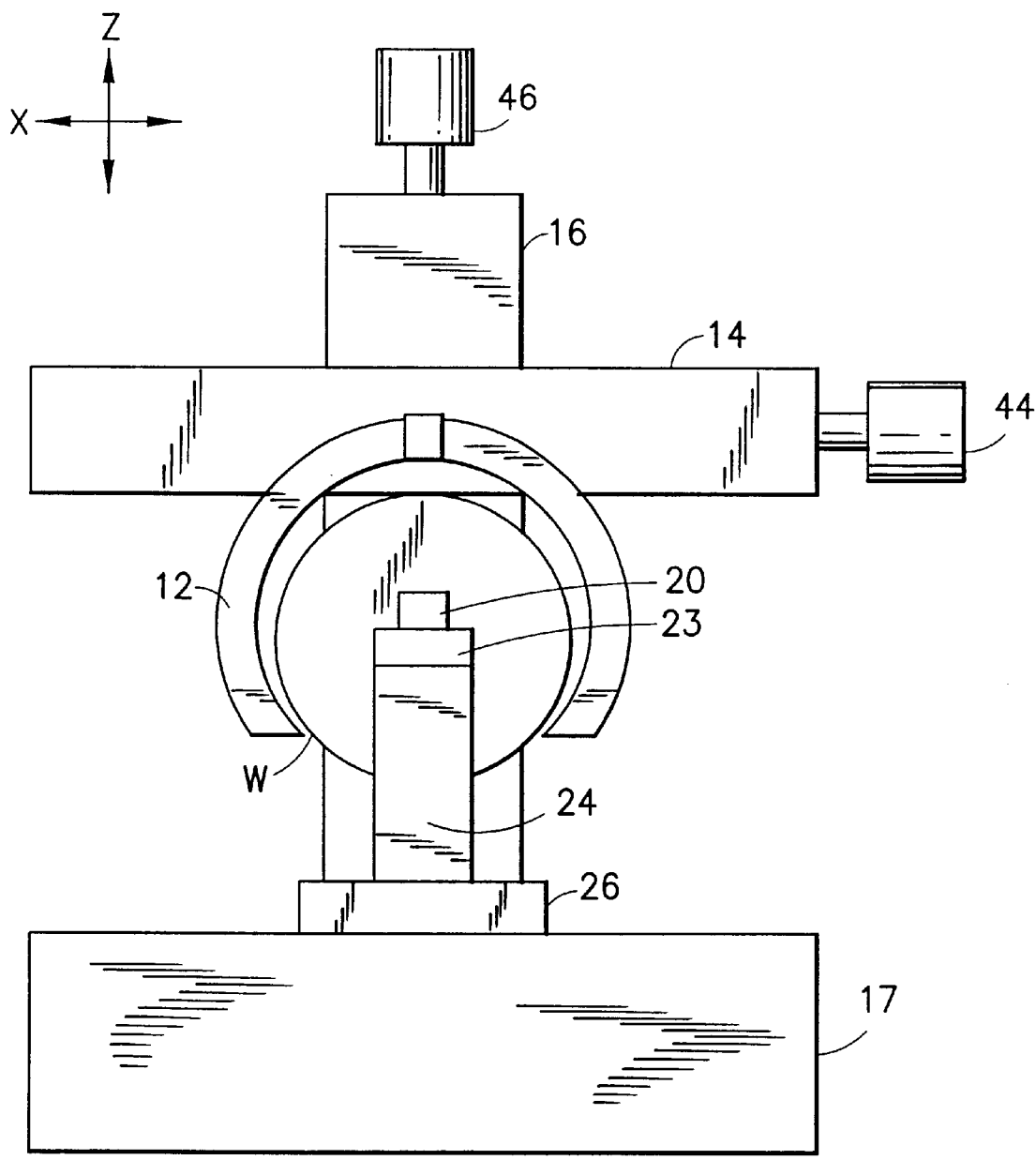
FIG. 3 is a schematic side view of the apparatus shown in FIG. 1.

Referring to FIGS. 1 through 3, an apparatus which may be used for determining the thickness, bow and warp of an article, such as a wafer, according to the method of the present invention is generally depicted. The apparatus will be described in the context of measuring the thickness, bow and warp of a wafer. Of course those skilled in the art will appreciate that articles other than wafers can be measured according to the method and apparatus of the present invention.

The apparatus 10 includes an article holder 12 that preferably holds an article, such as wafer W, by its edges. However, the holder 12 may be of a vacuum chuck type which holds the article by applying vacuum to a surface of the article. The holder 12 is mounted on a motorized X-axis translation stage 14. The X-axis translation stage 141 is mounted on a motorized Y-axis translation stage 16 which is attached to base 17. Together, the X-axis and Y-axis translation stages enable the article W to be moved in at least two directions for the purposes of scanning the wafer in a motion plane defined by the X and Y axes. When the article is a silicon wafer, the wafer is preferably mounted in a vertical manner to minimize the distortion effects of gravity on the wafer.

The apparatus 10 further includes first 18 and second 20 opposing distance sensing probes. A line drawn between the probes (FIGS. 6A and 6B) defines a common measurement axis $A_c$. The probes may be any type of device capable of determining the distance between it and a nearby surface. Common types of probes capable of distance determinations include capacitive and optical probes. Optical probes, such as those made by Keyence, are preferred because such probes offer spot size measurement on the order of 20 microns. Capacitive type probes typically offer a minimum spatial resolution of about 5 millimeters. The first probe 18 is mounted on a first probe Z—axis secondary translation stage 21 which enables the first probe to be moved in a Z-axis orthogonal direction relative to the rest of the apparatus 10. The first probe Z-axis secondary translation stage 21 is attached to the top of a first pedestal 22. The second probe 20 may be mounted on an optional second probe Z-axis secondary translation stage 23 which enables the second probe 20 to be moved in the Z-axis orthogonal direction relative to the rest of the apparatus 10. The second probe Z-axis secondary translation stage 23 is attached to a second pedestal 24. Those skilled in the art will now recognize that the first and second Z-axis secondary translation stages 21, 23 enable the probes 18, 20 to be set apart at a predetermined known distance D from each other to accommodate articles of different thicknesses. This may be accomplished by moving either probe or both. The first and second pedestals 22, 24 are mounted on a primary motorized Z-axis translation stage 26 which is supported by the base 17. The primary Z-axis translation stage permits the two probes, positioned at the known distance D from each other by the probe Z-axis secondary translation stages, to be moved together along the Z-axis direction, which is parallel to the common axis $A_c$.

Figure 4:
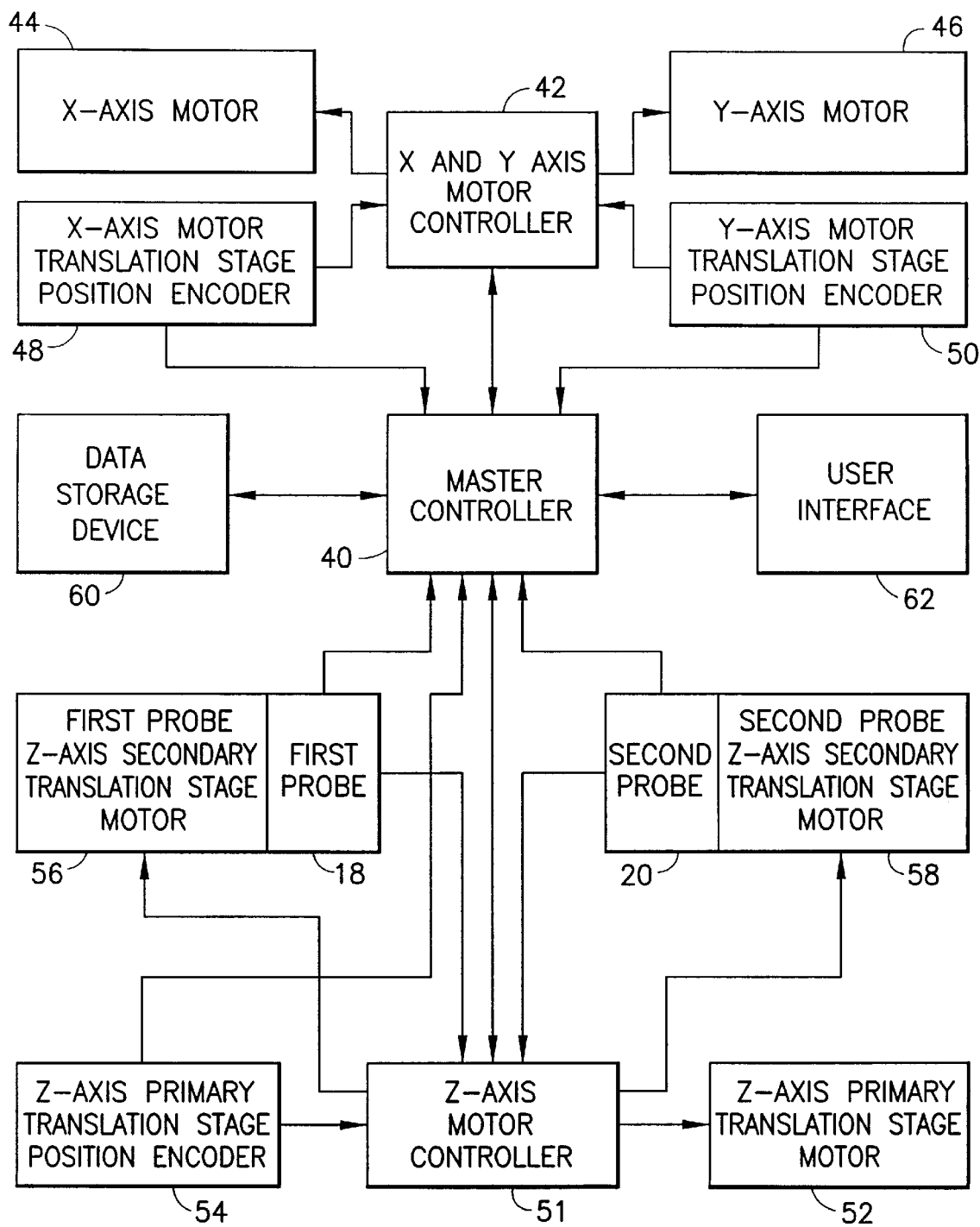
FIG. 4 is a general schematic diagram of the overall scanning control system.

Referring to FIG. 4, article scanning relative to and between the probes is controlled by a master controller 40. The master controller is connected to an X-Y axis motor controller 42. The master controller 40 provides the X-Y axis motor controller with operating instructions sufficient to chart movement of the article along the X and Y axes relative to the probes. The X-Y axis motor controller 42 is connected to X and Y axis stage motors 44, 46 and issues operating commands thereto to drive the X and Y axis motors to move the X and Y axis stages 14, 16 according to the instructions received from the master controller 40. X and Y axis stage position encoders 48, 50, connected to the X and Y axis stages, 14, 16 respectively, are connected to the X and Y axis motor controller 42, for conventional control feedback purposes, as well as to the master controller 40 for data recording purposes as will be described further below. Those skilled in the art will appreciate that substantially any type of scan pattern can be executed by the X-Y axis motor controller 42 in accordance with instructions received from the master controller 40.

The master controller 40 is operatively connected to a Z-axis motor controller 51 which drives a Z-axis primary stage motor 52 and receives Z-axis primary stage position information for conventional control feedback purposes from the output of a Z-axis primary translation stage position encoder 54. The position encoder's 54 output is also connected to the master controller 40 for data recording purposes. The Z-axis motor controller 51 is connected to the first and second probes 18, 20 for receiving distance information therefrom. The controller 51 can be configured to receive distance information from either the first, the second or both probes 18, 20, as desired. The 2-axis motor controller 51 is also connected to Z-axis secondary translation stage stepper motors 56, 58 and the controller is adapted to provide signals to the motors to drive either or both secondary Z-axis stages to desired positions as instructed by the master controller 40.

The position of the X and Y axis translation stages 14, 16 as well as the position of the Z-axis primary translation stage, as well as the distances a, b between the probes 18, 20 and the article W may be recorded periodically on a data storage device 60, such as a conventional magnetic disk or optical disk. A user interface 62, such as a keyboard and display, may also be provided on the apparatus to enable a user to interface with the apparatus. The master controller 40 may be constructed from any conventional computer system having sufficient speed, memory and number of input/output ports to support the control and data recording functions necessary to precisely move the article relative to the probes, and measure the distance between the probes and the article at preselected time intervals.

Those skilled in the art will appreciate that the above described apparatus is a preferred embodiment to move the article relative to the first and second probes 18, 20 and to record data. However, those skilled in the art will also appreciate that various parts of the apparatus described above may be rearranged to move the article relative to the first and second probes without departing from the spirit of the present invention. For example, those skilled in the art will appreciate that the article could be held stationary and the probes could be moved relative to the stationary article. The position of the probes relative to the stationary article could be recorded periodically to develop a thickness, bow and warp map for the article.

The Method

Figure 5:
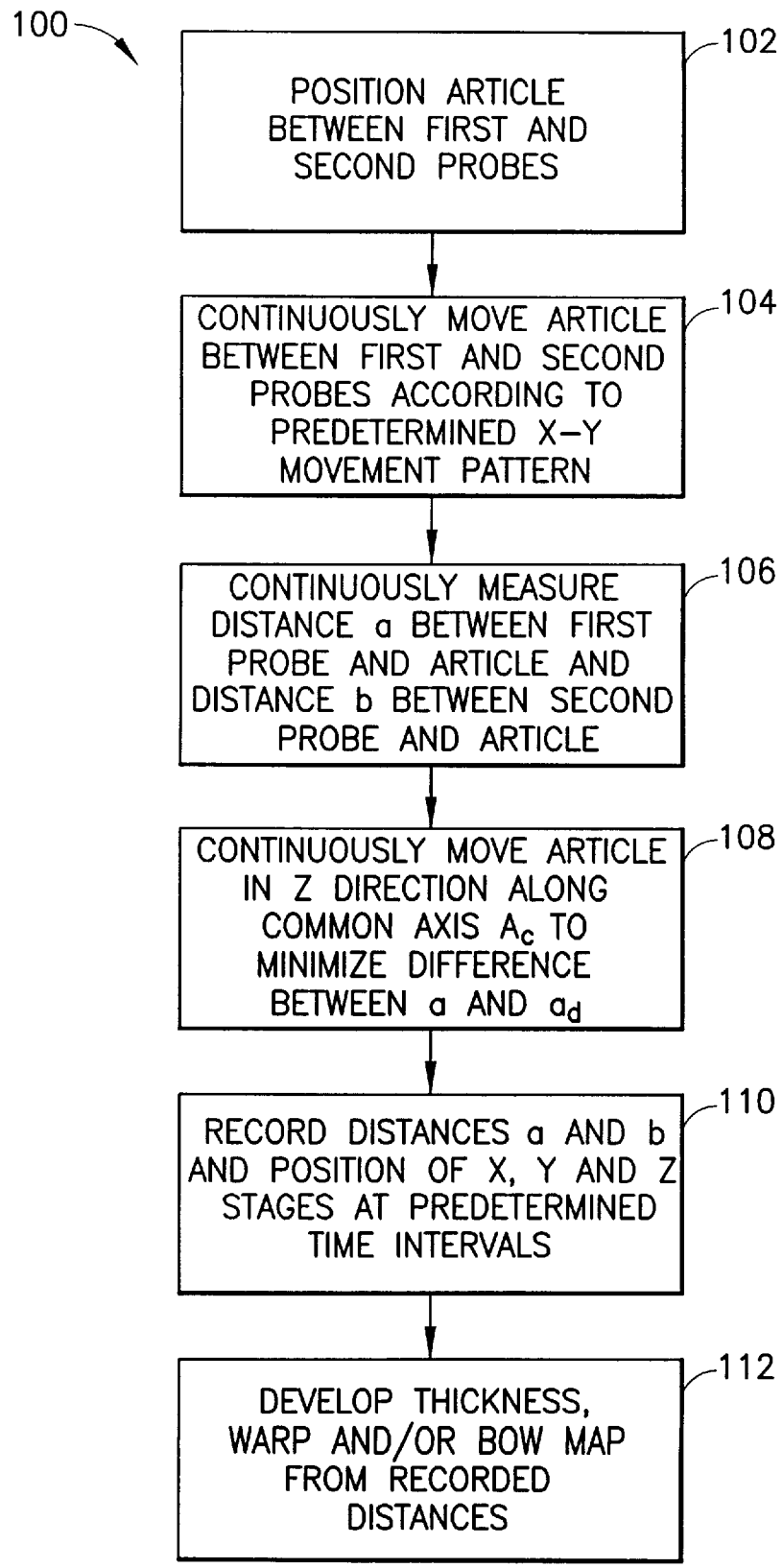
FIG. 5 is a flow chart illustrating the steps of a method for obtaining data to determine thickness, warp and bow of a silicon wafer.
Figure 6A:
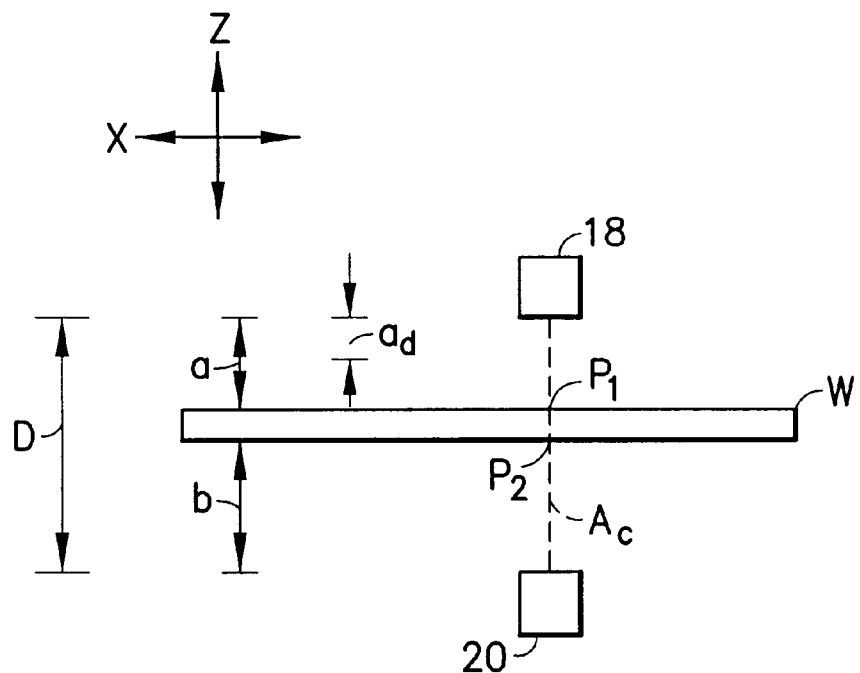
FIG. 6A is a partial plan view schematic diagram of the position of the article relative to the pair of distance sensing probes prior to moving the article relative to the probes according to the method of the present invention.
Figure 6B:
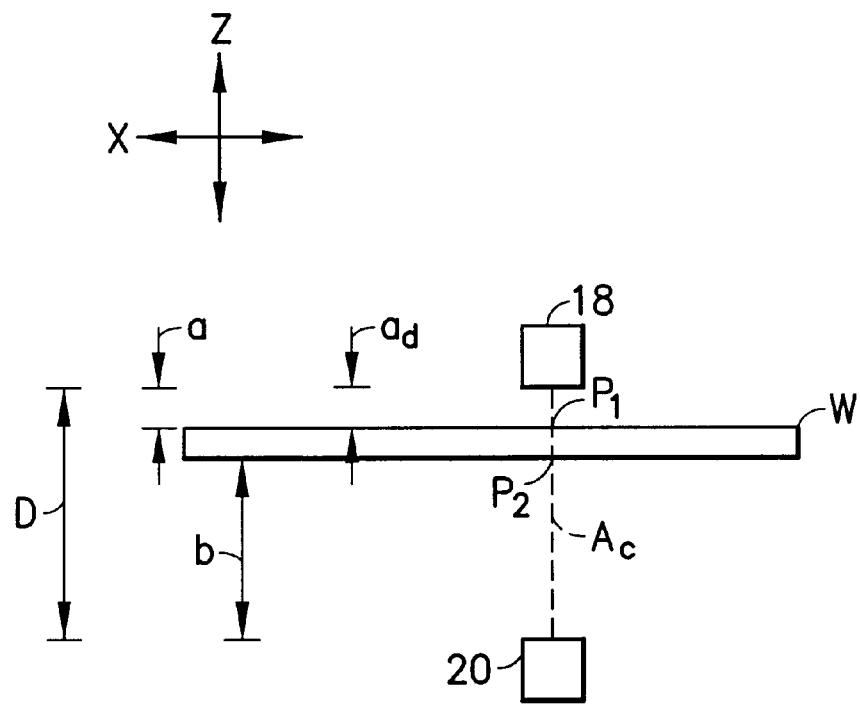
FIG. 6B is a partial plan view schematic diagram of the position of the article relative to the pair of distance sensing probes after the article is moved relative to the probes along axis $A_c$ according to the method of the present invention.

The controller 40 of the apparatus 10 described above is programmed to execute the method of the present invention, which is a method for moving an article relative to and between a pair of distance sensing probes, such as probes 18, 20 which are spaced apart a known distance D so that a thickness map for the article can be computed from recorded distance and article position data. Referring to the flow diagram of FIG. 5, according to the method 100, the article W is positioned between the pair of probes 18, 20 (step 102). The article is then moved continuously relative to and between the pair of probes in at least one direction in the plane normal to the common measurement axis $A_c$ (step 104). While the article is moving relative to the probes 18, 20 it is between, the distance a along the common measurement axis $A_c$ between the first probe and a point $P_1$ on the surface of the article nearest to the first probe which intersects the common measurement axis is measured and the distance b along the common measurement axis $A_c$ between the second probe and a point $P_2$ on the surface of the article nearest to the second probe is measured (step 106). From the measured distance a, the article is moved relative to the probes 18, 20 along the common measurement axis $A_c$ so as to minimize any difference between the measured distance a and a desired distance $a_d$ along the common measurement axis $A_c$ between the first probe and a point $P_1$ on the surface of the article nearest to the first probe (step 108). FIGS. 6A and 6B illustrate the relative movement of the article along the measurement axis $A_c$ according to the method. Of course those skilled in the art will appreciate that the minimization could occur between the second probe (distance b) and point $P_2$ instead of the first probe. Also, those skilled in the art will appreciate that the method can be carried out by moving the probes continuously relative to a stationary article or by moving the article relative to stationary probes.

At predetermined time intervals, the measured distance a, the measured distance b and the position readouts from the X, Y and/or Z translation stage position encoders 48, 50 and 54 are recorded (step 110). The recordation of the measured distance and position readouts results in an array of distance values and stage position readouts. From the array of distance values for a, b and X and Y translation stage position readouts, the thickness t of the article for a plurality of points in the plane defined by the X and Y axes can be calculated (step 112) from the equation:

$$t = D - (a+b) \quad (1)$$

Other article characterizations, such as bow and warp profiles, can also be calculated from the array of distance values a, b and position readouts from the X, Y and Z axis primary translation stages. Because a (or b) is nearly constant (i.e. $a \approx a_d$) as a result of moving the article relative to the probes along the common axis $A_c$, the thickness errors due to probe distance non-linearity can be minimized without extensive calibration.

The embodiment of the present invention disclosed herein admirably achieves the objects set forth; however, it should be appreciated by those skilled in the art that departures can be made by those skilled in the art without departing from the spirit and scope of the invention which is limited only by the following claims.

What is claimed is:

1. A method for moving an article relative to and between a pair of distance sensing probes of a thickness measuring apparatus which are spaced apart a known distance D, wherein a line between the probes defines a common measurement axis $A_c$ and wherein the apparatus has means to move the article between the of probes in a plane normal to the common measurement axis $A_c$ and to move the article relative to the probes along the common measurement axis $A_c$, the method comprising the steps of:

(a) providing an article having a surface;
    (b) continuously moving the article relative to and between the pair of probes in at least one direction in the plane normal to the common measurement axis $A_c$;
    (c) continuously measuring a distance a along the common measurement axis $A_c$ between the first probe of the pair and a point on the surface of the article nearest to the first probe that intersects the common measurement axis $A_c$ and continuously measuring a distance b along the common measurement axis $A_c$ between the second probe and a point on the surface of the article nearest to the second probe that intersects the common measurement axis $A_c$; and
    (d) from the measured distance, continuously moving the article relative to the probes along the common measurement axis $A_c$ so as to minimize any difference between the measured distance a and a desired distance $a_d$ along the common measurement axis $A_c$ between the first probe and a point on the surface of the article nearest to the first probe that intersects the common measurement axis $A_c$.

2. The method of claim 1, wherein in step (b) the article is moved relative to the probes in at least two orthogonal directions in the plane normal to the common measurement axis $A_c$.

3. A method for determining the thickness of an article moved relative to and between a pair of distance sensing probes of a thickness measuring apparatus which are spaced apart a known distance D, wherein a line between the probes defines a common measurement axis $A_c$ and wherein the apparatus has means to move the article between the of probes in a plane normal to the common measurement axis $A_c$ and to move the article relative to the probes along the common measurement axis $A_c$, the method comprising the steps of:

(a) providing an article having a surface;
    (b) continuously moving the article relative to and between the pair of probes in at least one direction in the plane normal to the common measurement axis $A_c$;
    (c) continuously measuring a distance a along the common measurement axis $A_c$ between the first probe of the pair and a point on the surface of the article nearest to the first probe that intersects the common measurement axis $A_c$ and continuously measuring a distance b along the common measurement axis $A_c$ between the second probe and a point on the surface of the article nearest to the second probe that intersects the common measurement axis $A_c$;
    (d) from the measured distance, continuously moving the article relative to the probes along the common measurement axis $A_c$ so as to minimize any difference between the measured distance a and a desired distance $a_d$ along the common measurement axis $A_c$ between the first probe and a point on the surface of the article nearest to the first probe that intersects the common measurement axis $A_c$;
    (e) recording the measured distance a and the measured distance b, and the position of the article relative to the probes in the plane normal to the common measurement axis $A_c$ at predetermined time intervals; and
    (f) computing a thickness map for the article from the distance and position measurements recorded in step (e).

4. The method of claim 3, wherein in step (e), the relative position of the article along the common measurement axis $A_c$ is also recorded.

5. The method of claim 4, wherein the warp or bow of the article is also computed from the recorded distance and relative position measurements.

6. An apparatus for determining the thickness of an article, the apparatus comprising:

first and second distance sensing probes, spaced apart from each other by a known distance D, wherein a line between the probes defines a common measurement axis $A_c$, wherein the first distance sensing probe is adapted to provide a distance signal indicative of the distance a between the first probe and a point on the surface of the article nearest to the first probe which intersects the common measurement axis, and wherein the second distance sensing probe is adapted to provide a distance signal indicative of the distance b between the second probe and the and a point on the surface of the article nearest to the second probe which intersects the common measurement axis;

means for continuously moving the article relative to and between the first and second distance sensing probes, wherein the means is adapted to move the article relative to the probes in at least one direction in the plane normal to the common measurement axis $A_c$;

means for indicating the position of the article relative to the probes in the plane normal to common measurement axis $A_c$;

means for substantially continually maintaining the distance between the surface of the article nearest the first probe and the first probe at a desired distance $a_d$, wherein the means is adapted to continuously maintain the desired distance $a_d$ based upon the measured distance a;

means for continuously recording the distances a and b and the position of the article relative to the probes in at least the plane normal to the common measurement axis $A_c$ at predetermined time intervals; and means for computing a thickness map for the article from the distances a and b relative article positions recorded at predetermined time intervals.

7. The apparatus of claim 6, wherein the means for moving the article relative to the probes is adapted to move the article relative to the probes in at least two orthogonal directions in the plane normal to the common measurement axis.

8. The apparatus of claim 6, wherein the apparatus further comprises means for indicating the position of the article relative to the probes along the common measurement axis $A_c$, wherein the recording means is further adapted to record the position of the article relative to the probes along the common measurement axis $A_c$, and wherein the apparatus further includes means for computing the bow or warp of the article based upon the recorded position of the article relative to the probes along the common measurement axis $A_c$.

* * * * *